United States Patent
Dahal et al.

(10) Patent No.: US 11,138,447 B2
(45) Date of Patent: Oct. 5, 2021

(54) METHOD FOR DETECTING RAISED PAVEMENT MARKERS, COMPUTER PROGRAM PRODUCT AND CAMERA SYSTEM FOR A VEHICLE

(71) Applicant: Connaught Electronics Ltd., Tuam (IE)

(72) Inventors: Ashok Dahal, Tuam (IE); Matthias Lenk, Tuam (IE); Michael Starr, Tuam (IE)

(73) Assignee: Connaught Electronics Ltd., Tuam (IE)

( * ) Notice: Subject to any disclaimer, the term of this patent is extended or adjusted under 35 U.S.C. 154(b) by 108 days.

(21) Appl. No.: 15/995,810

(22) Filed: Jun. 1, 2018

(65) Prior Publication Data
US 2019/0370563 A1  Dec. 5, 2019

(51) Int. Cl.
| | |
|---|---|
| *G06K 9/00* | (2006.01) |
| *G06K 9/46* | (2006.01) |
| *G06T 7/246* | (2017.01) |
| *G06T 7/12* | (2017.01) |

(52) U.S. Cl.
CPC ....... *G06K 9/00798* (2013.01); *G06K 9/4661* (2013.01); *G06T 7/12* (2017.01); *G06T 7/246* (2017.01); *G06T 2207/30256* (2013.01); *G06T 2210/12* (2013.01)

(58) Field of Classification Search
None
See application file for complete search history.

(56) References Cited

U.S. PATENT DOCUMENTS

| | | | |
|---|---|---|---|
| 7,933,434 B2 | 4/2011 | Aoki et al. | |
| 9,530,062 B2 | 12/2016 | Nguyen et al. | |
| 2003/0072471 A1* | 4/2003 | Otsuka | G05D 1/0246 |
| | | | 382/103 |
| 2008/0109118 A1* | 5/2008 | Schwartz | G06K 9/00798 |
| | | | 701/1 |
| 2010/0188507 A1 | 7/2010 | Kageyama et al. | |
| 2012/0296522 A1* | 11/2012 | Otuka | B60W 30/12 |
| | | | 701/41 |
| 2016/0001780 A1* | 1/2016 | Lee | G06K 9/00791 |
| | | | 701/48 |
| 2016/0121889 A1 | 5/2016 | Shimomura et al. | |
| 2016/0180177 A1* | 6/2016 | Nguyen | G06K 9/00798 |
| | | | 382/104 |

* cited by examiner

*Primary Examiner* — Matthew C Bella
*Assistant Examiner* — Brian D Shin
(74) *Attorney, Agent, or Firm* — Osha Bergman Watanabe & Burton LLP

(57) ABSTRACT

A method is disclosed for detecting raised pavement markers in an environment of a vehicle by a camera system. The method includes capturing at least one first image of at least one first part of the environment by at least one first camera of the camera system and analyzing the at least one first image and determining whether at least one first pavement marker is present in the environment in dependency of a result of the analysis of the at least one first image. The method further includes capturing at least one second image of at least one second part of the environment by at least one second camera of the camera system and analyzing the at least one second image and determining whether the at least one first or at least one second pavement marker is present in the environment in dependency of a result of the analysis.

15 Claims, 5 Drawing Sheets

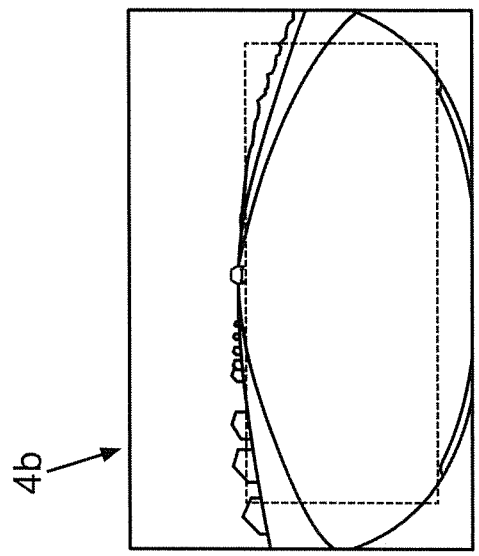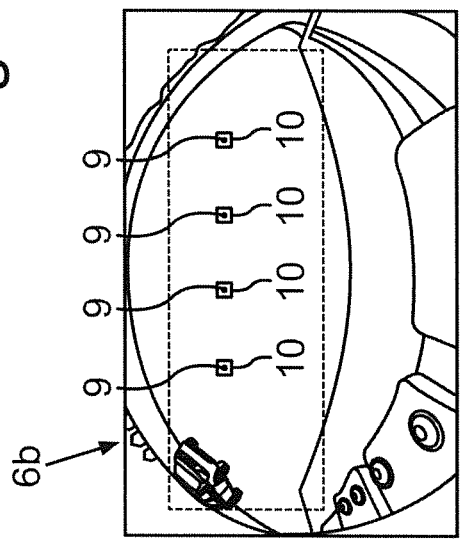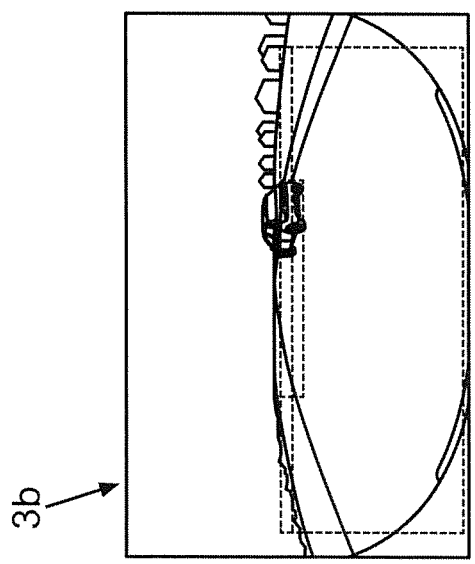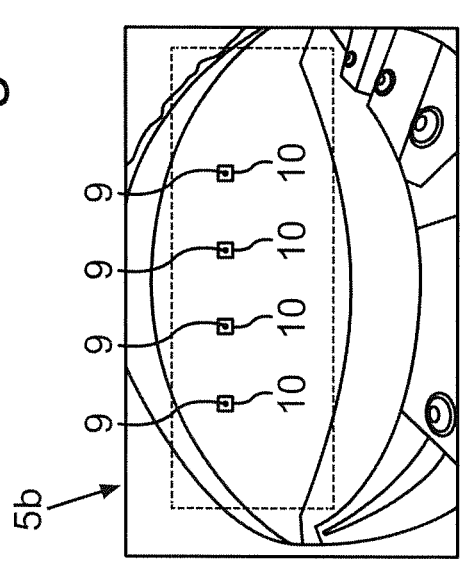

METHOD FOR DETECTING RAISED PAVEMENT MARKERS, COMPUTER PROGRAM PRODUCT AND CAMERA SYSTEM FOR A VEHICLE

FIELD OF THE INVENTION

The invention generally relates to a method for detecting raised pavement markers in an environment of a vehicle by means of a camera system of the vehicle, wherein at least one first image of at least one first part of the environment is captured by means of at least one first camera of the camera system, and wherein the at least one first image is analyzed and it is determined whether at least one first raised pavement marker is present in the environment in dependency of a result of the analysis of the at least first image. The invention also relates to a computer program product and a camera system for a vehicle for detecting raised pavement markers.

BACKGROUND

Systems and methods for detecting lane markings are known from the prior art. For example, U.S. Patent Application Publication No. 2016/0121889 A1 describes a travel lane marking recognition system, which uses an onboard camera, which captures an image of a travel lane ahead of a vehicle. Based on the captured image, travel lane markings can be recognized by means of a lane marking recognition system. This system however is only suitable for detecting regular lane markings, which usually have the form of colored, especially white, lines or dashed lines.

However, there exist also other forms of lane markings such as raised pavement markers which are used as safety device on roads. These raised pavement markers can be rectangular and reflective markers or round and non-reflective which are called botts dots. For this invention we use raised pavement makers and botts dots interchangeably. Such raised pavement markers can come in groups of several, and are typically arranged in a line or two lines. Due to their significantly different appearance in comparison to regular lane markings, like lines, line detectors are not suitable for detecting raised pavement markers as well. Moreover, in general raised pavement markers are very hard to detect since they are typically much smaller than lane markings in form of lines and therefore can also be easily confused with noise or other objects on the road. Also, existing solutions for raised pavement markers use only single front view camera system. It is not always guaranteed that a single camera will detect the raised pavement markers for every single frame of the scene because of weather conditions, time of day, lighting conditions, occlusions, and so on. Therefore, methods known up to now for detecting such raised pavement markers based on captured images suffer from the drawbacks, that the raised pavement markers can be detected only with quite low confidence, if at all.

Therefore, embodiments of the present invention advantageously provide a method, a computer program product and a camera system for detecting raised pavement markers, which allow for detecting raised pavement markers with much higher reliability and consistency.

SUMMARY

In accordance with embodiments of the invention a method is disclosed for detecting raised pavement markers in an environment of a vehicle by a camera system of the vehicle, the method comprising: capturing at least one first image of at least one first part of the environment by at least one first camera of the camera system; and analyzing the at least one first image and determining whether at least one first pavement marker is present in the environment in dependency of a result of the analysis of the at least one first image; capturing at least one second image of at least one second part of the environment by at least one second camera of the camera system; and analyzing the at least one second image and determining whether the at least one first or at least one second pavement marker is present in the environment in dependency of a result of the analysis of the at least one second image.

In some aspects of the method, the camera comprises four cameras as follows: a front camera, which captures a front view image; a rear camera, which captures a rear view image; a left mirror camera, which captures left side view image; and a right mirror camera, which captures a right side view image; wherein respective fields of view of the four cameras pairwise overlap, and wherein when raised pavement markers are detected in at least two of the front view image, the rear view image, the left side view image and the right side view image and additionally the at least two images, in which the raised pavement markers are detected, comprise an overlapping region the overlapping region of the two images are combined by image stitching; when raised pavement markers are detected in only one of the front view image, the rear view image, the left side view image and the right side view image, no image stitching is performed; when raised pavement markers are detected in at least two of the front view image, the rear view image, the left side view image and the right side view image and the at least two images, in which the raised pavement markers are detected, do not comprise an overlapping region, no image stitching is performed.

In some aspects of the method, when analyzing the at least one image, which is the first or second image, for at least one of the front view image, the rear view image, the left side view image and the right side view image, it is checked for at least one region fulfilling at least one first predefined condition, the at least one region is set as a possible candidate for being a raised pavement marker.

In some aspects of the method, the at least one predefined condition consists in that the at least one region has an edge comprising at least in part a predefined shape.

In some aspects of the method, the at least one predefined condition consists in that the at least one region has an at least in part circular or rectangular shaped edge.

In some aspects of the method, the at least one predefined condition consists in that the at least one region comprises a certain minimum brightness level, wherein the certain minimum brightness level is defined with respect to a brightness level of at least one neighboring region in the at least one image.

In some aspects of the method, if the at least one region is set as possible candidate, the at least one region is determined to be a raised pavement marker in dependency on an analysis of an image content of the corresponding region in comparison to an image content outside the region.

In some aspects of the method, if the at least one region is set as possible candidate, a size of the at least one region is determined and the candidate is determined to be a raised pavement marker in dependency on whether the determined size in vehicle coordinates lies within a predefined range.

In some aspects of the method, if more than a predefined number of regions are set as possible candidates, a quality score is determined for each candidate according to a predefined quality metric, wherein only the predefined number of candidates, which comprise the highest quality score, are considered as possible candidates further on, whereas the candidates not being one of the predefined number of candidates with the highest quality score are discarded.

In some aspects of the method, if several regions are set as possible candidates, it is checked whether each of the regions fulfills a collinearity criterion in the vehicle coordinates, and the respective regions are determined to be raised pavement markers in dependency on whether the respective region fulfills the collinearity criterion.

In some aspects of the method, if several regions are set as possible candidates, the possible candidates are grouped such that candidates belonging to the same group are collinear, and wherein candidates, which are not collinear with at least two other candidates are discarded.

In some aspects of the method, groups not containing at least a certain minimum number of candidates are discarded.

In some aspects of the method, if several regions are set as possible candidates, the distance between neighboring candidates is measured in the vehicle coordinates, wherein the respective regions are determined to be raised pavement markers in dependency on whether their respective distance to neighboring candidates lies within at least one first defined distance range.

In some aspects of the method, a bounding box is created based on several candidates belonging to the same group in the vehicle coordinates, wherein at least one parameter of the created bounding box, for a mean slope or an angle deviation, is determined and the candidates belonging to the group are discarded in case the at least one parameter of the bounding box is not within a defined range.

In accordance with embodiments of the invention, a computer program product is disclosed comprising program code stored in a non-transitory computer readable medium, and which when executed by a processor of an electronic control device causes the processor to perform a method according to the abovementioned method.

In accordance with embodiments of the invention, a camera system is disclosed for a vehicle for detecting raised pavement markers in an environment of the vehicle, the camera system comprising: at least one first camera, configured to capture at least one first image of at least one first part of the environment; and an analysis module, configured to analyze the at least one first image and to determine whether at least one first pavement marker is present in the environment in dependency of a result of the analysis of the at least one first image; at least one second camera, configured to capture at least one second image of at least one second part of the environment, and wherein the analysis module is further configured to analyze the at least one second image and to determine whether the at least one first or at least one second pavement marker is present in the environment in dependency of a result of the analysis of the at least one second image.

BRIEF DESCRIPTION OF THE DRAWINGS

FIG. 2 is a schematic illustration of an image captured by a front camera of the vehicle in accordance with one or more embodiments of the invention;

FIG. 3 is a schematic illustration of an image captured by a rear camera of the vehicle in accordance with one or more embodiments of the invention;

FIG. 4 is a schematic illustration of an image captured by a left mirror camera of the vehicle in accordance with one or more embodiments of the invention;

FIG. 5 is a schematic illustration of an image captured by a right mirror camera of the vehicle in accordance with one or more embodiments of the invention;

DETAILED DESCRIPTION

Figure 1:
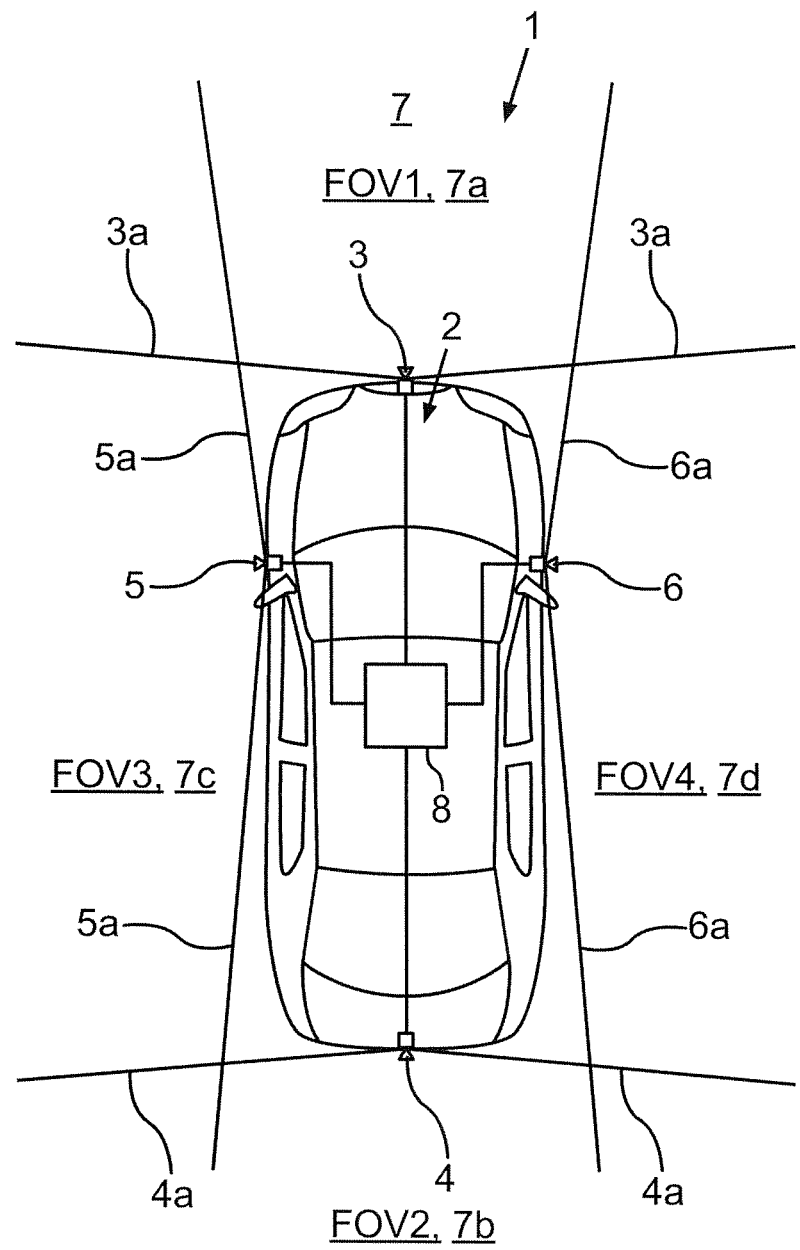
FIG. 1 is a schematic illustration of a vehicle comprising a camera system in accordance with one or more embodiments of the invention.

One or more embodiments disclosed herein describe a method, a computer program product and a camera system with the features as presented in the independent claims. One or more additional embodiments of the invention are subject of the dependent claims, the description and the drawings.

According to a method for detecting raised pavement markers in an environment of a vehicle by means of a camera system of a vehicle in the context of the invention, at least one first image of at least one first part of the environment is captured by means of at least one first camera of the camera system. Moreover, the at least one first image is analyzed and it is determined whether at least one first raised pavement marker is present in the environment in dependency of a result of the analysis of the at least one first image. Further, at least one second image of at least one second part of the environment is captured by means of at least one second camera of the camera system. The at least one second image is analyzed and it is determined whether the at least one first and/or at least one second raised pavement marker is present in the environment in dependency of a result of the analysis of the at least one second image.

By using multiple different cameras of the camera system for detecting raised pavement markers, the robustness of detection can highly be improved. Also the accuracy of the detection can be improved. So even if one of the cameras misses to detect existing raised pavement markers, there is still a chance that the other cameras(s) detect the existing raised pavement markers correctly.

Moreover, it is advantageous if the at least two cameras comprise an at least in part overlapping field of view. In other words, the first part of the environment captured by the at least one first camera and the at least one second part of the environment captured by the at least one second camera overlap partly and are partly different. The camera system can be configured for example as surround view camera system, comprising for example four cameras, namely a front camera, a rear camera, a left mirror camera and a right mirror camera. By means of these four cameras it is possible to capture the complete 360 degrees environment of the vehicle. By having overlapping regions, especially overlapping fields of view, the detection results in such an overlapping region can be compared and combined with each other and thereby the robustness and accuracy of the detection of raised pavement markers can be enhanced even more. So, advantageously, multiple cameras provide a significantly overlapped view of the same scene which increases the robustness of the detection. Moreover, a surround view camera system can capture multiple views, so for example lane markings outside the view of the front camera can still be captured by other cameras of the surround view camera system. Also, it is not guaranteed that the only front camera like the existing systems will detect the raised pavement markers consistently because of various weather and lighting conditions. But with the presence of multiple cameras the chance of detection can be significantly increased. Consequently, in case of the presence of raised pavement markers, a high number of those raised pavement markers can be detected correctly from multiple cameras, which again is advantageous for a precise prediction of the lane boundaries with high confidence. Also outliers can be filtered out much more easily without sacrificing the overall performance as we will have more candidates detected from multiple cameras. Therefore, as by means of multiple cameras the accuracy can be increased, also the reliability of the lane detection can be enhanced and much more safety can be provided.

Therefore, according to one or more advantageous embodiments of the invention, the camera system comprises four cameras, which are a front camera, which captures a front view image, a rear camera, which captures a rear view image, a left mirror camera, which captures left side view image, and a right mirror camera, which captures a right side view image, wherein respective fields of view of the four cameras pairwise overlap. In case raised pavement markers are searched for or detected in at least two of the front view image, the rear view image, the left side view image and the right side view image and additionally the at least two images, in which the raised pavement markers are searched for or detected, comprise an overlapping region, the overlapping region of the two images are combined by means of image stitching. Especially, in case raised pavement markers are detected in only one of the front view image, the rear view image, the left side view image and the right side view image, no image stitching is performed. Further, in case raised pavement markers are searched for or detected in at least two of the front view image, the rear view image, the left side view image and the right side view image and the at least two images, in which the raised pavement markers are searched for or detected, do not comprise an overlapping region, no image stitching is performed.

For example, in case raised pavement markers are searched for in all four images, then raised pavement markers in both of left and right side of vehicle can be detected, additionally using stitching to improve robustness in overlapping regions. In case raised pavement markers are searched for in only three of the four images, then raised pavement markers in both left and right side of the vehicle might be detected, again using stitching for improved robustness in overlapped regions. Where stitching is done depends on which three of the four cameras are able to detect raised pavement markers. Further, in case raised pavement markers are searched for in only two of the four images, then the following situations can occur:

It is searched for raised pavement markers in the left side view image and the right side view image: Raised pavement markers in both left and right side of vehicle might be detected, and hence, it is possible to detect lane markers on both sides of the vehicle. No stitching is performed as the left side view image and the right side view image do not comprise an overlapping region.

It is searched for raised pavement markers in the front view image and the left side view image: Raised pavement markers in both left and right side of vehicle might be detected, and further the images will be stitched in their overlapping regions for improved robustness.

It is searched for raised pavement markers in the front view image and the right side view image: Raised pavement markers in both left and right side of vehicle might be detected, and further the images will be stitched in their overlapping regions for improved robustness.

It is searched for raised pavement markers in the rear view image and the left side view image: Raised pavement markers in both left and right side of vehicle might be detected, and further the images will be stitched in their overlapping regions for improved robustness.

It is searched for raised pavement markers in the rear view image and the right side view image: Raised pavement markers in both left and right side of vehicle might be detected, and further the images will be stitched in their overlapping regions for improved robustness It is searched for raised pavement markers in the front view image and the rear view image: Raised pavement markers in both left and right side of vehicle might be detected, but no stitching is performed as the front view image and the rear view image do not comprise an overlapping region.

Further, in case raised pavement markers are detected in only one of the four images, then if the image is the front view image or the rear view image, raised pavement markers might be detected in both left and right side of the vehicle and hence it is possible to detect both lanes. If the image is the left side view image, only left raised pavement markers can be detected and hence it is only possible to detect the left lane. If the image is the right side view image, only right raised pavement markers can be detected and hence it is only possible to detect the right lane. No stitching is done at all in all these scenarios.

According to one or more advantageous embodiments of the invention, when analyzing the at least one first image, which is the first and/or second image, especially at least one of the front view image, the rear view image, the left side view image and the right side view image, it is checked whether the at least one first image comprises at least one region fulfilling at least one first predefined condition, wherein if it is determined as a result that the at least one first image comprises at least one region fulfilling the at least one first predefined condition, the at least one region is set as a possible candidate for being a raised pavement marker. The analysis performed for detecting possible candidates for being raised pavement markers can be performed in the same way for the first image as well as for the second image or also for any further image captured by any further camera of the camera system. Especially, all analysis steps described in the following also can be performed with each captured image independently. Moreover, the at least one first predefined condition can be adapted to the typical characteristics of raised pavement markers. Furthermore, there are several suitable conditions which can serve as at least one first predefined condition, on the basis of which possible candidates for being a raised pavement marker can be identified. Furthermore, it is also advantageous to not instantly assume that a region fulfilling the at least one first predefined condition in fact is a raised pavement marker, but instead to set such regions as possible candidates, to which further false positive rejection methods can be applied. This way more reliable results can be achieved.

Moreover, according to one or more advantageous embodiments of the invention, the at least one predefined condition consists in that the at least one region has an edge comprising at least in part a predefined shape. As raised pavement markers significantly differ from lane markers in form of lines with regard to their shapes, it is very advantageous to use a shape criterion for identifying or detecting raised pavement markers. To check whether a certain region comprises an edge with such a certain shape, it is further advantageous to first apply some kind of edge detection method to the captured at least one first image. For example, a top hat filter can be applied to the captured image, especially using a grey scale image as input, followed by a Gaussian filtering, which is applied for smoothing on the output image of the top head filtering. Moreover, the morphological gradients and their directions can then be calculated from the output image of the Gaussian filtering. The edges, that are then extracted from the gradient image, can then advantageously be narrowed by using non-maximum suppression technique, also known as edge thinning. Based on this final image, in which, essentially, only thinned edges of different regions and/or objects in the image are left, one can look for edges comprising at least in part that predefined shape.

Further, it is especially advantageous, if that predefined shape is a circle, as usually raised pavement markers are circular shaped. Therefore, according to one or more advantageous embodiments of the invention, the at least one predefined condition consists in the at least one region has an at least in part circular shaped edge. This way, circular shaped raised pavement markers can be detected. For detecting raised pavement markers comprising a different shape, like square, then the predefined condition would consist in the at least one region has an at least in part square shaped edge. Other shapes can be detected similarly.

According to one or more advantageous embodiments of the invention the at least one predefined condition consists in that the at least one region comprises a certain minimum brightness level, especially wherein the certain minimum brightness level is defined with respect to a brightness level of at least one neighboring region in the at least one first image. Usually, raised pavement markers are white, yellow, blue or green and therefore are typically much brighter than the color of a road surface. Hence, the brightness of regions in the image is another very useful characteristic for detecting raised pavement markers and filtering out outliers.

According to one or more advantageous embodiments of the invention, if the at least one region is set as possible candidate, the at least one region is determined to be a raised pavement marker in dependency on an analysis of an image content of the corresponding region in comparison to an image content outside the region. Therefore, advantageously, also image content of the possible candidate for being raised pavement markers can be checked, as pixel inside and outside the raised pavement markers regions have different characteristics. These different characteristics can now advantageously be used to detect raised pavement markers in the image and on the other hand to reject false positives. Such a separation or filtering can be performed on the basis of a suitable feature descriptor, which can distinguish false positives over true positives.

According to one or more advantageous embodiments of the invention, if the at least one region is set as possible candidate, a size of the at least one region is determined and the candidate is determined to be a raised pavement marker in dependency on whether the determined size lies within a predefined range. For the purpose of determining the size of the at least one region, it is further advantageous to transform the position of the at least one region in the image from image coordinates system into a vehicle coordinates system. In fact, all the further outlier rejection steps will be performed in vehicle coordinates system as we will be dealing with actual size and distances of candidate raised pavement markers. In vehicle coordinates it can be easily checked whether the size of raised pavement marker candidates in the vehicle coordinates lies within the predefined range, so that only raised pavement marker candidates with certain valid sizes are selected for further processing. Raised pavement marker candidates, which have a size larger than a predefined threshold size, are preferably discarded. Optionally, also a threshold for a minimum size can be provided. Moreover, it can also be checked, whether the candidates are located inside or outside a defined region of interest in vehicle coordinates. Candidates which are located outside such a defined region of interest can be discarded as well. By means of such a spatial filtering, the accuracy and robustness of the detection can be enhanced even more. Typically lane markings extend on the left side and/or on the right side of the vehicle along a moving direction of the vehicle. Therefore, e.g. candidates lying directly on the moving path of the vehicle itself can be identified as outliers. Also raised pavement marker candidates not lying somewhere on the road surface can be considered as noise and therefore be filtered using defined region of interest in vehicle coordinates.

It further can be taken into account, especially for the spatial filtering, that raised pavement markers that delimit a lane usually are distributed according to a certain pattern. Based on this knowledge, further conditions, that raised pavement marker candidates have to fulfill to be finally regarded as actual raised pavement markers, can be provided. But before this spatial analysis of the distribution of possible candidates, it is further preferred that only candidates with the highest quality are subject to further processing, at least in case the number of found candidates exceeds a predefined maximum number per frame. Thereby computing power can be saved, which makes it possible to implement the method according to the invention or its embodiments in the form of an embedded system.

Hence, it is one or more advantageous embodiments of the invention, that, if more than a predefined number of regions are set as possible candidates, a quality score is determined for each candidate according to a predefined quality metric, wherein only the predefined number of candidates, which comprise the highest quality score, are considered as possible candidates further on, whereas the candidates not being one of the predefined number of candidates with the highest quality score are discarded. This way, it can be advantageously avoided, that false positives candidates corrupt the actual raised pavement marker segments, as there can be only a certain predefined number of valid raised pavement markers within the region of interest, especially with regard to a single frame.

The quality of a candidate can be described for example in dependency of the circularity or rectangularity of the corresponding region, as well as in dependency of its brightness. The more circular or rectangular a region of a possible candidate is and the brighter such a region is in comparison to a neighboring region, the higher the quality of the raised pavement markers candidate. The difference in brightness can be measured e.g. by determining the average gradient magnitude of a raised pavement markers region, and the circularity or rectangularity can be measured e.g. by using a histogram distribution of directions found in the raised pavement markers region, especially with regard to its edges.

According to one or more advantageous embodiments of the invention, if several regions are set as possible candidates, it is checked whether each of the regions fulfills a collinearity criterion, and the respective regions are determined to be raised pavement markers in dependency on whether the respective region fulfills the collinearity criterion or not. This is another very advantageous criterion to distinguish between false positives and true positives of the possible candidates for being raised pavement markers. This is due to the fact that raised pavement markers are usually positioned in a line. Therefore, raised pavement marker candidates, which do not lie in a straight line with at least two other raised pavement marker candidates can be filtered as outliers. Moreover, as roads may sometimes comprise several lines of raised pavement markers, the collinearity criterion can advantageously also be used for grouping the found candidates.

Therefore, it is one or more advantageous embodiments of the invention that, if several regions are set as possible candidates, the possible candidates are grouped such that candidates belonging to the same group are collinear, and wherein candidates, which are not collinear with at least two other candidates are discarded. Therefore, raised pavement marker candidates, which belong to the same boundary of the road can be grouped together. For grouping the possible candidates on the basis of the collinearity criterion, known methods like RANSAC (Random Sample Consensus) can be used. Further, once a candidate has been assigned to one group, this candidate cannot be considered for the rest of the groups anymore.

Further, another advantageous outlier criterion is, that each group should have at least N members. Therefore, it is one or more advantageous embodiments of the invention, that groups not containing at least a certain minimum number of candidates are discarded. For example, in case a group does not have more than three or more raised pavement marker candidates, then it is very likely, that the raised pavement marker candidates are outliers or false positives and are discarded.

Moreover, also the distance between two neighboring raised pavement marker candidates in the vehicle coordinates can advantageously be used as a further criterion for rejecting false positives. So, according to one or more advantageous embodiments of the invention, if several regions are set as possible candidates, the distance between neighboring candidates is measured, wherein the respective regions are determined to be raised pavement markers in dependency on whether their respective distance to neighboring candidates lies within at least one first defined distance range. Especially, these steps can be performed for each group as previously defined separately.

One or more embodiments are based on the finding that, especially in the USA, the distance between raised pavement markers lies either within a short interval, usually between 100 mm and 150 mm, or a long interval, which usually is between 400 mm and 450 mm. So, it is especially advantageous, when in fact two different distance ranges are defined and the raised pavement marker candidates, which comprise a distance to their next neighbors, that does not lie within one of these two defined distance ranges, are discarded. Preferably, these two distance ranges can advantageously defined as described above, namely one ranging from 100 mm to 150 mm and the other one ranging from 400 mm to 450 mm. Thereby, outliers can be detected very effectively. It would be also thinkable to determine the at least one first defined distance range, or also optionally further second distance ranges in dependency of a geographical position or in dependency of the country, in which the method and/or camera system is used, as different countries might have different standards concerning the distance between raised pavement markers in raised pavement markers lines.

According to one or more advantageous embodiments of the invention a bounding box is created based on several candidates belonging to the same group, wherein at least one parameter of the created bounding box, especially a mean slope and/or an angle deviation, is determined and the candidates belonging to the group are discarded in case the at least one parameter of the bounding box is not within a defined range. This can be advantageously be performed as a final outlier rejection step. Thereby, the raised pavement marker features can be represented in a bounding box and the characteristics of the bounding box can be checked to decide if the detected raised pavement markers segment constitutes an outlier or not, especially before classifying it as a lane marker. As characteristics of the bounding box a mean slope and angle deviation of the bounding box can be checked. If the detected raised pavement marker segments are within the certain threshold for mean slope and angle deviation, the segment, namely the group of candidates, can be classified as lane marker. Otherwise, the raised pavement marker candidates are discarded.

For determining the bounding box, first of all the center of the contour of each region corresponding to a possible candidate can be calculated. After that, the center of the contour is considered as the representative raised pavement marker pixel. Each raised pavement markers candidate (center pixels) detected that way can be transformed to vehicle coordinates by taking four corner points from the center pixel based on the size of the raised pavement marker determined in image coordinates. Hence, for several raised pavement markers detected, several of these points can be generated, which are then used to get the bounding box. The bounding box therefore contains several raised pavement markers candidates, which are then, based on the characteristics of the bounding box, either rejected all together or all approved. This way, in case several candidates lying in a line, comprising the correct sizes and distances to each other, have been detected, it can be additionally checked, e.g. whether this line of raised pavement markers extends along the road surface or e.g. perpendicular to the road surface. This can be determined on the basis of the mean slope and/or angle deviation of the bounding box. In case such a line of detected raised pavement marker candidates would extend perpendicular to the road surface, the detected raised pavement marker candidates cannot be raised pavement markers actually, which can advantageously be determined on the basis of the bounding box method.

All the conditions, criteria and methods for distinguishing between raised pavement markers and outliers or false positives can be combined in any arbitrary way. Though not every measure or step presented for rejecting false positives needs to be performed, is very advantageous if all the presented steps are combined and executed one after the other, since this way outlier detection can be performed very effectively and raised pavement markers can be detected with high robustness and accuracy.

The invention also relates to a computer program product comprising program code stored in a computer readable medium like a disc, CD, DVD, memory card, or similar, and which when executed by a processor of an electronic control device causes the processor to perform a method according to the invention or its embodiments.

The invention also relates to a camera system for a vehicle for detecting raised pavement markers in an environment of the vehicle, wherein the camera system comprises at least one first camera, which is configured to capture at least one first image of at least one first part of the environment and an analysis module, which is configured to analyze the at least one first image and to determine whether at least one first raised pavement marker is present in the environment in dependency of a result of the analysis of the at least one first image. In case two or more camera detect raised pavement markers, the similar detections are stitched together in overlapping regions in camera system accordingly for better accuracy and robustness. Moreover, the camera system comprises at least one second camera, which is configured to capture at least one second image of at least one second part of the environment, wherein the analysis module is configure to analyze the at least one second image and to determine whether the at least one first and/or at least one second raised pavement marker is present in the environment in dependency of a result of the analysis of the at least one second image.

The capturing of the images by the respective cameras preferably is performed in a same time step or time interval.

The invention also relates to a driver assistance system and a vehicle comprising a camera system according to the invention.

The advantages described with regard to the method according to the invention and its embodiments also apply in similar way to the computer program product, the camera system, the driver assistance system and the vehicle according to the invention.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not have all of the features of an originally formulated independent claim. Moreover, implementations and feature combinations are to be considered as disclosed, in particular by the implementations set out above, which extend beyond or deviate from the feature combinations set out in the relations of the claims.

FIG. 1 shows a schematic illustration of a vehicle 1 comprising a camera system 2 for detecting raised pavement markers according one or more embodiments of the invention. The camera system 2 is configured as surround view camera system and comprises in this example a front camera 3, a rear camera 4, a left mirror camera 5 and a right mirror camera 6. Each of the cameras 3, 4, 5, 6 is configured as a wide angle camera and may comprise a fish eye lens. Therefore a very large field of view can be captured by each of the cameras 3, 4, 5, 6. In this example the front camera 3 comprises a corresponding field of view FOV1 which is limited in the horizontal plane by the illustrated boarder lines 3a. In particular, the horizontal plane extends perpendicular to the vertical axis of the vehicle 1. Analogously, the rear camera 4 comprises a corresponding field of view FOV2, which is limited in the horizontal plane by the corresponding boarder lines 4a. The left mirror camera 5 comprises a corresponding field of view FOV3, which is limited in the horizontal plane by the illustrated boarder lines 5a, and the right mirror camera 6 comprises a corresponding field of view FOV4, which is limited in the horizontal plane by the illustrated boarder lines 6a. Therefore each of the cameras 3, 4, 5, 6 is configured to capture a corresponding part 7a, 7b, 7c, 7d of the environment 7 of the vehicle 1. Moreover, the respective fields of view FOV1, FOV2, FOV3, FOV4 pairwise overlap.

The camera system 2 also comprises an analysis module 8, which analyses the images captured by the respective cameras 3, 4, 5, 6. This analysis module 8 advantageously is configured to detect raised pavement markers, on the basis of the captured images. Thereby, the analysis module 8 not only analyses the images captured by the front camera 3, but also analyses the images captured by the rear camera 4 as well as by the mirror cameras 5 and 6 for detecting raised pavement markers. This allows for a much higher accuracy in the detection of raised pavement markers. This is explained now in more detail with regard to FIG. 2 to FIG. 5.

FIG. 2 shows a schematic illustration of one or more embodiments of an image 3b captured by the front camera 3, FIG. 3 shows a schematic illustration of one or more embodiments of an image 4b captured by the rear camera 4, FIG. 4 shows a schematic illustration of one or more embodiments of an image 5b captured by the left mirror camera 5 and FIG. 5 shows a schematic illustration of one or more embodiments of an image 6b captured by the right mirror camera 6. All images 3b, 4b, 5b, 6b have been captured at almost the same time. In all these cases raised pavement markers in form of botts dots are present on the street for indicating different lanes. However, these botts dots are not visible in the images 3b, 4b captured by the front and rear camera 3, 4 respectively, and therefore cannot be detected on the basis of these images 3b, 4b by means of the analysis module 8. However, these botts dots 9 are clearly visible in the images 5b, 6b of the left and right mirror cameras 5, 6 respectively and have been marked in this example by square indicators 10. These indicators 10 illustrate, that the analysis module 8 was able to detect these botts dots 9 on the basis of the respective captured images 5b, 6b of the left and right mirror cameras 5, 6. As can be seen from this example, the probability, that at least by means of one of the cameras 3, 4, 5, 6 existing botts dots can be detected successfully, can be enormously enhanced by using all the cameras 3, 4, 5, 6 for the detection of botts dots instead of using just a single one like only the front camera 3. Moreover, because the fields of view FOV1, FOV2 FOV3, FOV4 of the respective cameras 3, 4, 5, 6 overlap at least in part, the detection results based on the analysis of each of the camera images 3b, 4b, 5b, 6b can be compared with each other and stitched together, such that finally also the accuracy of the detection can be enhanced enormously, at least in case botts dots are detected in such overlapping regions of the fields of view FOV1, FOV2, FOV3, FOV4 by two or more cameras 3, 4, 5, 6 at the same time.

Figure 6:
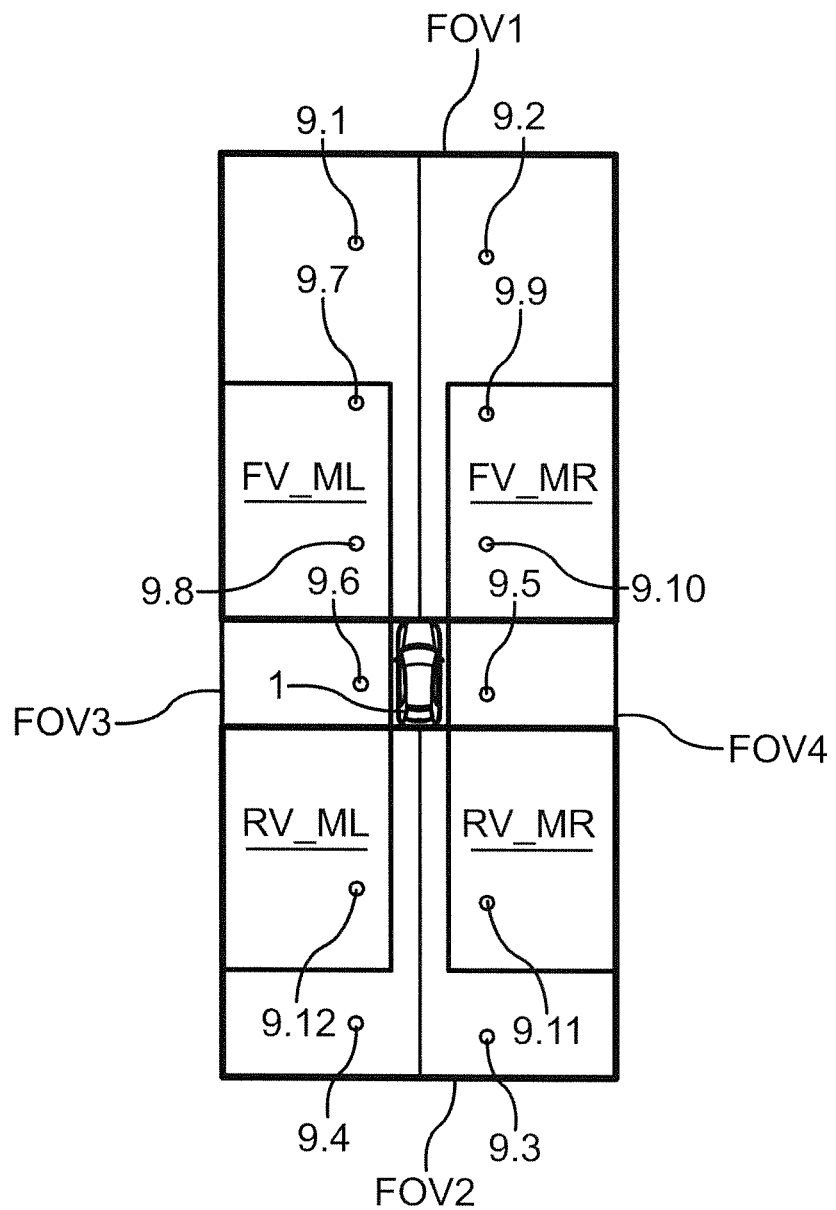
FIG. 6 is a schematic illustration of a vehicle comprising a camera system in accordance with one or more embodiments of the invention.

This is illustrated in more detail in FIG. 6, which shows a schematic illustration of one or more embodiments of the vehicle 1 similar to FIG. 1, and the corresponding fields of view FOV1, FOV2, FOV3, FOV4 of the respective cameras 3, 4, 5, 6 of the camera system 2 of the vehicle 1. Moreover, the front camera 3 and the left mirror camera 5 comprise an overlapping field of view, which is denoted by FV_ML. The front camera 3 and the right mirror camera 6 comprise an overlapping field of view, which is denoted by FV_MR. The rear camera 4 and the right mirror camera 6 comprise an overlapping field of view, which is denoted by RV_MR and the rear camera 4 and the left mirror camera 5 comprise an overlapping field of view, which is denoted by RV_ML. Additionally, the raised pavement markers 9.1, 9.2, 9.3, 9.4, 9.5, 9.6, 9.7, 9.8, 9.9, 9.10, 9.11, 9.12 are illustrated, which in this example limit the lane, along which the vehicle 1 is currently driving, on both sides. At the currently shown situation the raised pavement markers 9.1 and 9.2 can only be detected by the front camera 3, the raised pavement markers 9.3 and 9.4 can only be detected by the rear camera 4, the raised pavement marker 9.6 can only be detected by the left mirror camera 5 and the raised pavement marker 9.5 can only be detected by the right mirror camera 6. The raised pavement markers 9.7 and 9.8 lie in the overlapping field of view FV_ML of the front camera 3 and the left mirror camera 5, and therefore can be detected by both of those cameras 3, 5. The raised pavement markers 9.9 and 9.10 lie in the overlapping field of view FV_MR of the front camera 3 and the right mirror camera 6, and therefore can be detected by both of those cameras 3, 6. The raised pavement marker 9.11 lies in the overlapping field of view RV_MR of the rear camera 4 and the right mirror camera 6, and therefore can be detected by both of those cameras 4, 6. The raised pavement marker 9.12 lies in the overlapping field of view RV_ML of the rear camera 4 and the left mirror camera 5, and therefore can be detected by both of those cameras 4, 5. The images of the cameras 3, 4, 5, 6 can be stitched in the corresponding overlapping regions FV_ML, FV_MR, RV_ML, RV_MR to improve accuracy and robustness.

To enhance robustness and accuracy even more, the invention and its embodiments also provide very advantageous possibilities of detecting outliers, as also the detection of outliers and the rejection of those plays a crucial role in accuracy and robustness. This is, among others, due to the fact that raised pavement markers are much harder to detect than normal pavement markers in form of lines and can much more easily be confused with noises and other small objects on road surface, which therefore is very demanding with regard to a correct outlier detection. The invention and its embodiments provide multiple advantageous and combinable ways to filter out outliers and to detect raised pavement markers with high confidence and consistency, which are explained in the following.

Figure 7:
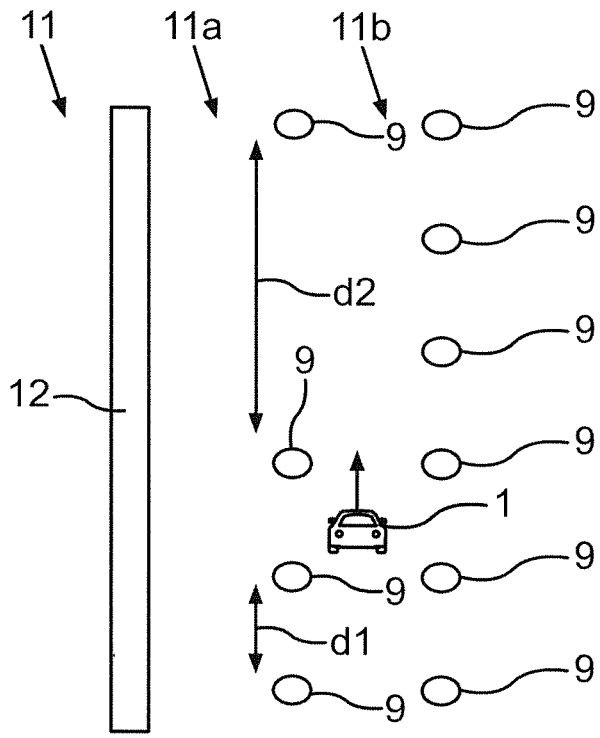
FIG. 7 is a schematic illustration of a road comprising two lanes, which are separated by raised pavement markers.

For a better understanding FIG. 7 shows a schematic illustration of one or more embodiments having a road 11 comprising two lanes 11a, 11b. The first lane 11a comprises botts dots 9 on the one side and on the other side a regular lane marker in form of a colored line 12. The second lane is bordered on both sides by botts dots 9. Usually, botts dots 9 comprise a circular shape, have a certain size, which typically lies between 100 mm and 150 mm in diameter, and are arranged in certain patterns as can be seen from FIG. 7, typically in a line and moreover appear in certain intervals. Thereby, botts dots 9 of short intervals comprise a distance d1 to each other in the range of 100 mm to 150 mm, and botts dots 9 of long intervals typically comprise a distance d2 to each other in the range between 400 mm and 450 mm.

All these information can now advantageously be used by the analysis module 8 for the detection of botts dots 9 on the basis of the images 3b, 4b, 5b, 6b captured by the respective cameras 3, 4, 5, 6. This analysis is now described in more detail with regard to FIG. 8.

Figure 8:
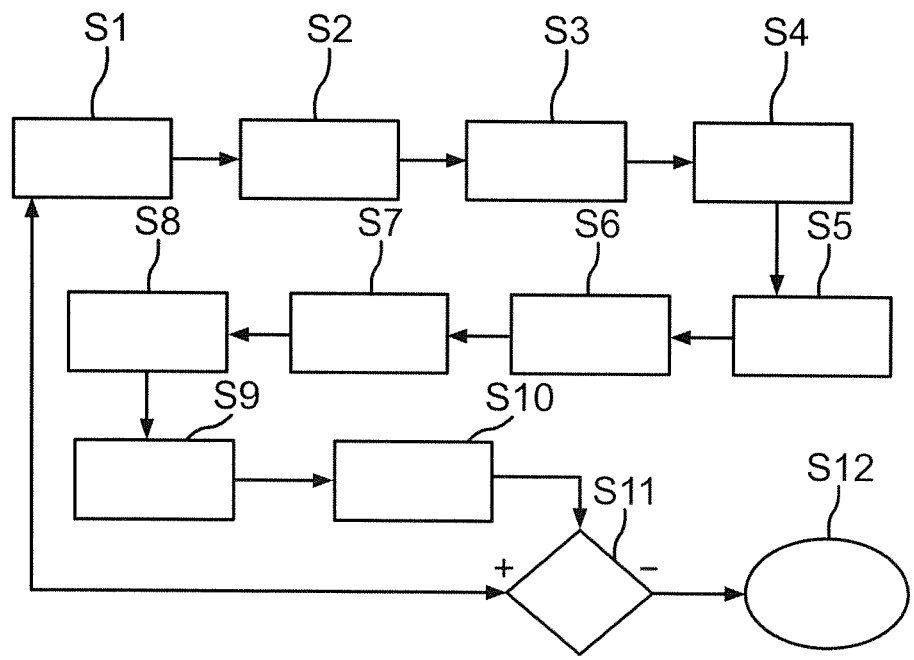
FIG. 8 is a flow chart illustrating a method for detecting raised pavement markers in accordance with one or more embodiments of the invention.

FIG. 8 shows a flow chart illustrating a method for detecting botts dots 9 according to one or more embodiments of the invention. The method described in the following can be applied to every captured image separately.

The method starts in step S1, where a top hat filtering is performed on a captured image. Top hat filtering is basically a morphological opening operation, where first an erosion and then a dilation is performed with the same structuring element for both operations and then the result is subtracted from the input image. The result of the top hat filtering in step S1 is then passed for smoothing in step S2, where a Gaussian filtering is performed on the resulting image. After that in step S3 the morphological gradient and its direction is calculated. This then results in an edge image, especially the resulting edges can then be extracted from the gradient image and are then narrowed using non-maximum suppression in step S4. After that in step S5 it is searched for circular or rectangular edges in the gradient image by means of circular or rectangular edge tracking. Thereby, the edge pixels are linked into edge polygon by an edge linking procedure, also called edge tracking. Based on found possible candidates for raised pavement markers in step S5 certain raised pavement markers features can be extracted in step S6, which can then be used for false positive rejection in step S7. For example, for an actual raised pavement markers the end points of the edge track cannot be further apart than the size of the shape, which is calculated as the average of the size in x and y direction. Furthermore, the direction distribution can be analyzed so that certain directions are expected in the upper or left part of the shape. Moreover, it can be detected if the shape, that is the possible candidate of being a raised pavement markers, is a bright or a dark spot, and only bright spots are allowed. Also the circularity or rectangularity of the candidates can be checked so that candidates with a long elongated shape are discarded. For that purpose, a line can be fitted through the edge points of the candidates and the length and height of the candidates is determined so that false positives can be marked in case a defined threshold related to the size is exceeded. Apart from that, also the image content of the raised pavement marker candidates can be checked, as pixels inside and outside the shape have different characteristics. Thereby, so called flood filling can be used to collect pixels inside and outside of the candidates and then by means of a feature descriptor false positives can be distinguished over true positives.

Furthermore, a spatial filtering can be performed, where the raised pavement markers candidate points are preferably first transformed into a vehicle coordinates system. By means of such a transform, each pixel of the image can be assigned to a defined region of interest in the vehicle coordinates system. For that purpose calibrated cameras can be used. Using the vehicle coordinates system makes it much easier to determine sizes and geometric measurements. Therefore, after the transformation into the vehicle coordinates system, the size of the raised pavement markers candidates can be checked and only candidates with certain valid sizes can be selected for further processing, whereas other candidates are discarded. Moreover, also all the candidates that are located outside a certain defined region of interest in vehicle coordinates can be discarded as well. Moreover, it is advantageous to take only raised pavement marker candidates with high quality scores for further processing. Thereby it can be avoided, that false positives candidates corrupt the actual raised pavement markers segment as there can be only a certain number of valid raised pavement markers within the region of interest of one single frame. Taking into account that the set of raised pavement markers that delimit a lane should be distributed according to a pattern, e.g. as shown in FIG. 7, the raised pavement markers candidates that belong to the same boundary can be grouped together using association. By means of association groups of at least N collinear botts dots candidates can be created using RANSAC in step S8. Once a candidate has been assigned to one group this candidate is not considered for the rest of the groups. Moreover, for every group created, the distance between members of the group in vehicle coordinates can be analyzed in step S9. If the distance between two raised pavement marker candidates is not within the expected ranges, like those as described with regard to FIG. 7, those points can be removed from the group. Moreover, as each group should have at least N members. The size of each group can be checked again after this stage and only those groups that have at least N members are set as output in step S10. Moreover, also confidence values related to quality and existence of the detected raised pavement markers can be calculated. For example, the quality Q can be calculated by means of the following formula:

$$Q = \frac{\sum_{i=0}^{N-1}(histDist_i * avgGradMag_i)}{N * M}$$

Where N is the total number of detected raised pavement markers, M is a normalization constant, histDist is the histogram distribution of the directions in a corresponding detected raised pavement markers, wherein the maximum value is 8, and avgGradMag is the average gradient magnitude of the brightness distribution of a raised pavement marker, wherein the maximum value is 255.

The existence confidence E can then be calculated according the following formula:

$$E = Q * \frac{N}{MAX\_BD\_FEATURES}$$

Where MAX_BD_FEATURES is the maximum number of raised pavement markers allowed per frame.

The quality Q measures the overall quality of detected raised pavement markers in a boundary candidate and the existence confidence measures the probability of existence of detected raised pavement markers depending on the number of detected raised pavement markers and the quality.

Moreover, as a further optional final outlier rejection step, the detected group of raised pavement markers can be represented in a bounding box and the characteristics of the bounding box can be checked to decide if the detected raised pavement markers segment, e.g. the raised pavement markers belonging to a common group, is an outlier or not before classifying those group of raised pavement markers as a lane marker in step S10. Thereby a mean slope and angle deviation of the bounding box can be checked. If the detected raised pavement marker segments are within the certain threshold for mean slope and angle deviation, the segment can be considered as lane marker. After that it can be checked in step S11, whether the whole procedure shall be repeated for the next frame or not. If yes, the procedure again starts in step S1 on the basis of the images captured by the cameras 3, 4, 5, 6 of the camera system 2 in the next frame. Otherwise the procedure is terminated in step S12.

Moreover, as an alternative for the circular edge tracking as described with regard to step S5, another possibility would be looking for circular shapes within certain radii and determine if botts dots candidates exist or not in the circle circumference. The radius for the circle can be approximated based on the location of the grid being processed using the vehicle coordinates system. Once the circle radius is approximated, two radii, one larger and one smaller than the approximation, can be used to look for botts dots candidates. So, for example, for a pixel A, the 16 pixel locations in the perimeter of the circle with A as center can be checked for both radii. If a certain number of continuous gradient intensity can be found, namely greater than a certain threshold, on those 16 locations, the pixel can be considered to be processed as botts dots pixels and the radius along with the x and y location can be stored. The quality score can also be calculated and the score will be the higher the higher numbers of continuous valid gradient intensities are discovered. While doing so, the score of the radius, which has the highest score among the two radii, can be taken. Thereby, several candidates can be detected for the same botts dots, which can be merged later based on a certain criterion such as pixel distance between the points.

Figure 9:
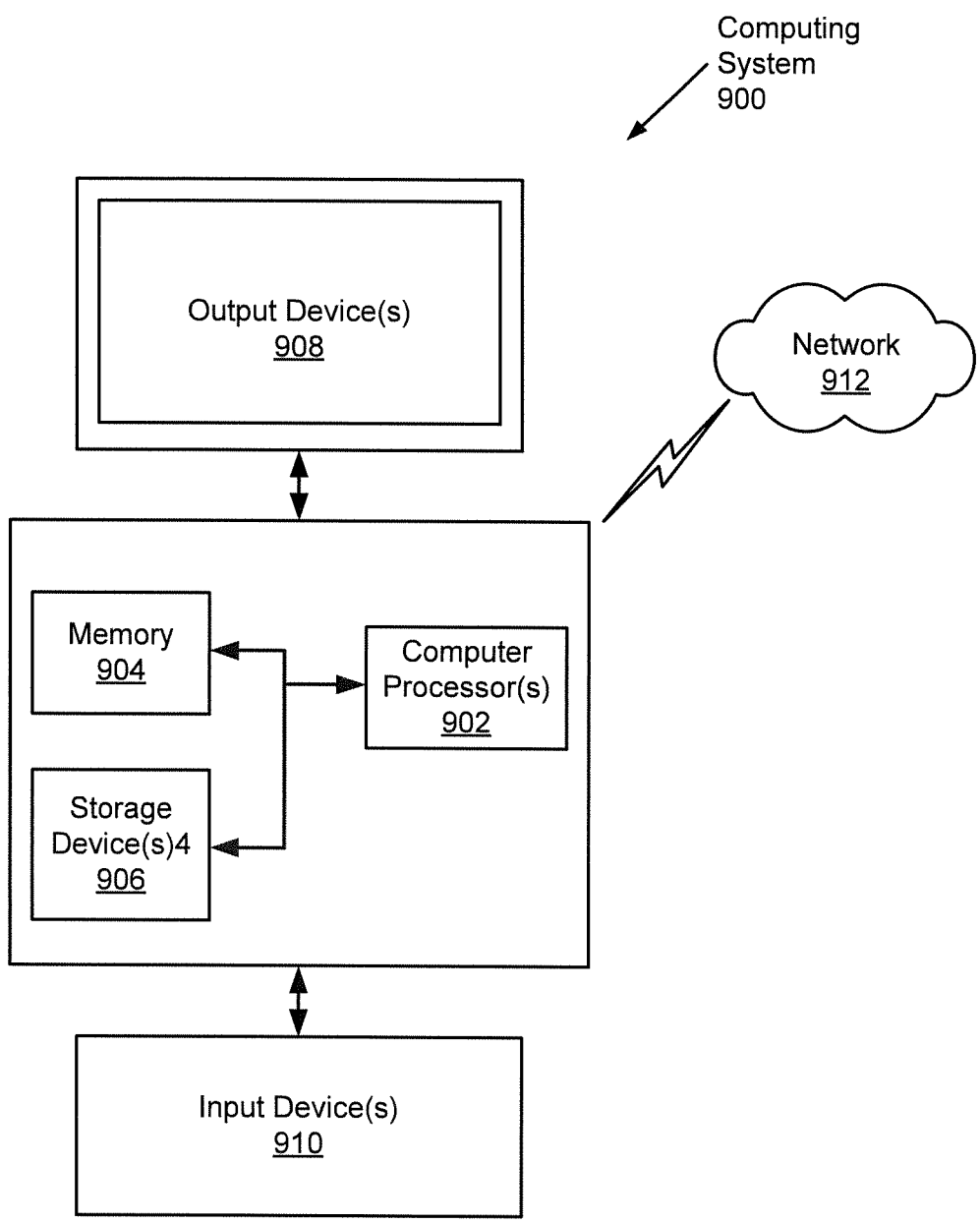
FIG. 9 is a computing system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 9, the computing system 900 may include one or more computer processor(s) 902, associated memory 904 (e.g., random access memory (RAM), cache memory, flash memory, etc.), one or more storage device(s) 906 (e.g., a hard disk, an optical drive such as a compact disk (CD) drive or digital versatile disk (DVD) drive, a flash memory stick, etc.), and numerous other elements and functionalities. The computer processor(s) 902 may be an integrated circuit for processing instructions. For example, the computer processor(s) may be one or more cores, or micro-cores of a processor. The computing system 900 may also include one or more input device(s) 910, such as a touchscreen, keyboard, mouse, microphone, touchpad, electronic pen, or any other type of input device. Further, the computing system 900 may include one or more output device(s) 908, such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system 900 may be connected to a network 912 (e.g., a local area network (LAN), a wide area network (WAN) such as the Internet, mobile network, or any other type of network) via a network interface connection (not shown). The input and output device(s) may be locally or remotely (e.g., via the network 912) connected to the computer processor(s) 902, memory 904, and storage device(s) 906. Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system 900 may be located at a remote location and be connected to the other elements over a network 912. Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A method for detecting raised pavement markers in an environment of a vehicle by a camera system of the vehicle, the method comprising:
    capturing, using a first camera of the camera system, at least one first image of at least one first part of the environment; and
    analyzing the at least one first image;
    determining whether at least one first pavement marker is present in the environment in dependency of a result of the analysis of the at least one first image;
    capturing, using a second camera of the camera system, at least one second image of at least one second part of the environment;
    analyzing the at least one second image; and
    determining whether the at least one first or at least one second pavement marker is present in the environment in dependency of a result of the analysis of the at least one second image,
    wherein both of the at least one first and second images are different from each other, and are one of a front view image, a rear view image, a left side view image, and a right side view image, and
    wherein the first camera and the second camera are each on a different side of the vehicle selected from the group consisting of: a front side, a rear side, a left side, and a right side of the vehicle,
    wherein the camera system comprises four cameras as follows: a front camera, which captures the front view image, a rear camera, which captures the rear view image, a left mirror camera, which captures the left side view image, and a right mirror camera, which captures the right side view image,
    wherein respective fields of view of the four cameras pairwise overlap, and
    wherein when raised pavement markers are detected in at least two of the front view, the rear view, the left side view and the right side view images and additionally the at least two images comprise an overlapping region, the overlapping region of the two images are combined by image stitching,
    when raised pavement markers are detected in only one of the front view, the rear view, the left side view and the right side view images, no image stitching is performed, and
    when raised pavement markers are detected in at least two of the front view, the rear view, the left side view and the right side view images and the at least two images do not comprise an overlapping region, no image stitching is performed.

2. The method according to claim 1, wherein when analyzing the at least one image, which is the first or second image, for at least one of the front view image, the rear view image, the left side view image and the right side view image, it is checked for at least one region fulfilling at least one first predefined condition, the at least one region is set as a possible candidate for being a raised pavement marker.

3. The method according to claim 2, wherein the at least one predefined condition consists in that the at least one region has an edge comprising at least in part a predefined shape.

4. The method according to claim 2, wherein the at least one predefined condition consists in that the at least one region has an at least in part circular or rectangular shaped edge.

5. The method according to claim 2, wherein the at least one predefined condition consists in that the at least one region comprises a certain minimum brightness level, wherein the certain minimum brightness level is defined with respect to a brightness level of at least one neighboring region in the at least one image.

6. The method according to claim 2, wherein if the at least one region is set as possible candidate, the at least one region is determined to be a raised pavement marker in dependency on an analysis of an image content of the corresponding region in comparison to an image content outside the region.

7. The method according to claim 2, wherein if the at least one region is set as possible candidate, a size of the at least one region is determined and the candidate is determined to be a raised pavement marker in dependency on whether the determined size in vehicle coordinates lies within a predefined range.

8. The method according to claim 2, wherein if more than a predefined number of regions are set as possible candidates, a quality score is determined for each candidate according to a predefined quality metric, wherein only the predefined number of candidates, which comprise the highest quality score, are considered as possible candidates further on, whereas the candidates not being one of the predefined number of candidates with the highest quality score are discarded.

9. The method according to claim 2, wherein if several regions are set as possible candidates, it is checked whether each of the regions fulfills a collinearity criterion in the vehicle coordinates, and the respective regions are determined to be raised pavement markers in dependency on whether the respective region fulfills the collinearity criterion.

10. The method according to claim 2, wherein if several regions are set as possible candidates, the possible candidates are grouped such that candidates belonging to the same group are collinear, and wherein candidates, which are not collinear with at least two other candidates are discarded.

11. The method according to claim 10, wherein groups not containing at least a certain minimum number of candidates are discarded.

12. The method according to claim 2, wherein if several regions are set as possible candidates, the distance between neighboring candidates is measured in the vehicle coordinates, wherein the respective regions are determined to be raised pavement markers in dependency on whether their respective distance to neighboring candidates lies within at least one first defined distance range.

13. The method according to claim 8, wherein a bounding box is created based on several candidates belonging to the same group in the vehicle coordinates, wherein at least one parameter of the created bounding box, for a mean slope or an angle deviation, is determined and the candidates belonging to the group are discarded in case the at least one parameter of the bounding box is not within a defined range.

14. A computer program product comprising program code stored in a non-transitory computer readable medium, and which when executed by a processor of an electronic control device causes the processor to perform a method according to claim 1.

15. A camera system for a vehicle for detecting raised pavement markers in an environment of the vehicle, the camera system comprising:
   a first camera configured to capture at least one first image of at least one first part of the environment;
   an analysis module configured to:
      analyze the at least one first image and
      determine whether at least one first pavement marker is present in the environment in dependency of a result of the analysis of the at least one first image; and
   a second camera configured to capture at least one second image of at least one second part of the environment, wherein the analysis module is further configured to:
      analyze the at least one second image, and
      determine whether the at least one first or at least one second pavement marker is present in the environment in dependency of a result of the analysis of the at least one second image,
   wherein both of the at least one first and second images are different view images selected from the group consisting of: a front view image, a rear view image, a left side view image, and a right side view image, and
   wherein the first camera and the second camera are each on a different side of the vehicle selected from the group consisting of: a front side, a rear side, a left side, and a right side of the vehicle,
   wherein the camera system comprises four cameras as follows: a front camera, which captures the front view image, a rear camera, which captures the rear view image, a left mirror camera, which captures the left side view image, and a right mirror camera, which captures the right side view image,
   wherein respective fields of view of the four cameras pairwise overlap, and
   wherein when raised pavement markers are detected in at least two of the front view, the rear view, the left side view and the right side view images and additionally the at least two images comprise an overlapping region, the overlapping region of the two images are combined by image stitching,
   when raised pavement markers are detected in only one of the front view, the rear view, the left side view and the right side view images, no image stitching is performed, and
   when raised pavement markers are detected in at least two of the front view, the rear view, the left side view and the right side view images and the at least two images do not comprise an overlapping region, no image stitching is performed.

* * * * *